United States Patent [19]

Matthews et al.

[11] Patent Number: 5,129,145
[45] Date of Patent: Jul. 14, 1992

[54] VALVE RECONDITIONING PROCESS

[75] Inventors: Alvin J. Matthews, Pittsburgh; Wade A. Kunis, East Pittsburgh, both of Pa.

[73] Assignee: Westinghouse Air Brake Company, Wilmerding, Pa.

[21] Appl. No.: 736,979

[22] Filed: Jul. 29, 1991

[51] Int. Cl.$^5$ .......................... B21D 53/00; B23K 9/04
[52] U.S. Cl. .......................... 29/890.121; 29/890.124; 29/402.06
[58] Field of Search ............ 29/407, 890.121, 890.124, 29/402.03, 402.04, 402.06, 402.18

[56] References Cited

U.S. PATENT DOCUMENTS

| 2,958,561 | 11/1960 | May | 303/8 |
| 3,208,801 | 9/1965 | McClure | 303/36 |
| 3,504,950 | 4/1970 | McClure | 303/35 |
| 4,593,445 | 6/1986 | Snyder et al. | 29/890.121 |

*Primary Examiner*—Timothy V. Eley
*Attorney, Agent, or Firm*—James O. Ray

[57] ABSTRACT

A valve restoration process including the steps of disassembling the valve into its component parts, applying a cleaning solution to a choke portion, a spring retainer portion, a body portion, a valve seat portion and a valve stem portion of such valve and thereafter cleaning these portions with a brush to remove extraneous foreign material therefrom. Thereafter removing such cleaning solution and relapping such valve stem portion to such valve seat portion to insure a good sealing surface. Finally, removing the lapping component from each of such valve stem and such valve seat and reassembling such valve.

19 Claims, No Drawings

VALVE RECONDITIONING PROCESS

CROSS REFERENCE TO RELATED APPLICATIONS

The invention claimed in this application is closely related to the following concurrently filed applications owned by the assignee of this invention. "Apparatus for Removing Press Fit Pins" having Ser. No. 07/736,992; "Valve Seat Reconditioning Apparatus" having Ser. No. 07/737,087; and "Method of Reconditioning Valves" having Ser. No. 07/737,094.

FIELD OF THE INVENTION

The present invention relates, in general, to fluid pressure responsive valves and, more particularly, this invention relates to a fluid pressure responsive valve restoration process, for a valve that has been removed from a valve body, that will enable such valve to be reused, after reconditioning for its intended purposes, within such valve body without loss of efficiency or durability when placed in service.

BACKGROUND OF THE INVENTION

It has been known, prior to the present invention, to recondition fluid pressure operated valves. In the prior art practice, such valves have been reconstructed by removing various valve portions etc. from a valve body and replacing them with new components. These valves, for example, may be pneumatically operated brake valves for railway cars and locomotives or they may be hydraulic or pneumatic pressure valves which are used in various other applications in the transportation industry.

Obviously, this prior art practice is costly not only to the company involved in reconditioning these valves but it is likewise costly to the end user of such valves who must pay for such reconditioning. Nevertheless, reconditioned valves are normally less costly than totally new valves. It is well known that, during use, the ends of the valve portions which carry a valve seat thereon can become worn during normal operation of the valves. When this situation arises, leakage of the valve begins and will progress to the point where the valve must be disassembled and certain components replaced therein.

From the above discussion, it is obvious that a need exists for a more economical process for reconditioning fluid pressure responsive valves.

SUMMARY OF THE INVENTION

The present invention provides a fluid pressure responsive valve restoration process. After the valve has been removed from a valve body, use of this process will enable such valve to be reused for its intended purposes within such valve body. Further, such use can be achieved without loss of either efficiency or durability of the valve during normal service. This valve restoration process includes the steps of disassembling such valve into its component parts. After the valve has been disassembled, a preselected cleaning solution is applied to such choke portion of such valve. After application of the cleaning solution, such choke portion is cleaned with a brush having a predetermined stiffness in order to remove the extraneous foreign material therefrom. Such process also includes applying the preselected cleaning solution to a spring retainer portion of such valve and thereafter cleaning the spring retainer portion with the brush having such predetermined stiffness to remove the extraneous foreign material adhered thereto. Also, the preselected cleaning solution is applied to the valve body portion of such valve and such valve body portion is thereafter cleaned with the brush to again remove extraneous foreign material therefrom. The valve seat disposed in the body portion of such valve is then cleaned to remove extraneous foreign material therefrom and the preselected cleaning solution is applied to the valve stem portion of such valve. After such cleaning solution has been applied to the valve stem portion, it is cleaned with such brush to remove the extraneous foreign material adhering thereto. Thereafter, such preselected cleaning solution applied to each of the brush portion of such valve, the spring retainer portion of such valve, the body portion of such valve and such valve stem portion is removed. Thereafter, such valve stem portion is relapped to the valve seat to insure a good sealing surface therebetween. After relapping, the lapping compound is removed from each of such valve stem and such valve seat and such valve can now be reassembled.

OBJECTS OF THE INVENTION

It is, therefore, one of the primary objects of the present invention to provide a fluid pressure responsive valve restoration process which will allow such valve to be reused for its intended purposes.

Another object of the present invention is to provide a fluid pressure responsive valve restoration process in which the efficiency of the reconditioned valve will be substantially the same as the efficiency of a new valve.

Still another object of the present invention is to provide a fluid pressure responsive valve restoration process in which the durability of the reconditioned valve will be essentially the same durability as a new valve.

A further object of the present invention is to provide a fluid pressure responsive valve restoration process which will result in substantial cost savings to both the reconditioner of such valve and to the end user of such valve.

It is an additional object of the present invention to provide a fluid pressure responsive valve restoration process which is relatively simple to perform.

A still further object of the present invention is to provide a fluid pressure responsive valve restoration process which does not require any special tools to perform.

Yet a further object of the present invention is to provide a fluid pressure responsive valve restoration process which will require a minimum number of new component parts.

In addition with the numerous objects and advantages of the fluid pressure responsive valve restoration process described above, various additional objects and advantages of the present invention will become more readily apparent to those persons who are skilled in the fluid pressure responsive valve art from the following, more detailed, description of the invention and the appended claims.

DETAILED DESCRIPTION

The present invention teaches a fluid pressure responsive valve restoration process. Such process is used on a valve that has been removed from a valve body. Use of this process enables the valve to be reused for its intended purpose within the valve body without resulting in a loss of efficiency or durability of the valve during service.

Although the invention is not limited thereto, the restoration process is particularly useful on valves used in the railway transportation industry. These valves are normally pneumatic valves, however, the process applies equally to hydraulic valves used in other segments of the transportation industry, for example truck valves.

The valve restoration process, according to the present invention, includes the steps of dismantling the valve after it has been removed from the valve body into its various component parts. A preselected cleaning solution is then applied to the choke portion of such valve and such choke portion is cleaned with a brush having a predetermined stiffness so that any extraneous foreign material adhered thereto can be removed. In the presently preferred embodiment of the invention, such brush will be a brush having wire bristles.

The preselected cleaning solution, which in the presently preferred embodiment of the invention will be mineral spirits, is applied to the body portion of such valve. Thereafter such body portion of the valve is cleaned with the brush to remove any extraneous foreign material adhered thereto. The valve body portion has a valve seat disposed therein which is then cleaned to remove the extraneous foreign material therefrom.

The preselected cleaning solution is then applied to the valve stem portion of such valve and such valve stem portion is thereafter cleaned with such brush to remove the extraneous foreign material therefrom.

At this point, such preselected cleaning solution is removed from each of such choke portion of the valve, the spring retainer portion of such valve, the body portion of such valve and the valve stem portion of such valve. Preferably, the removal of such cleaning solution includes the step of drying each component part described above. The drying of such component parts is preferably accomplished using compressed air.

After the cleaning solution has been removed, the valve stem portion of the valve is then relapped to the valve seat to insure a good sealing surface between such valve stem and such valve seat. After the relapping has been achieved, the lapping component is then removed from both the valve stem and the valve seat. Such valve is now ready to be reassembled. In some instances, it may be desirable that such valve restoration process will include the additional step of retapping a threaded portion of at least one of such body portion of such valve and such choke portion of such valve. Normally, both the choke portion and the body portion of the valve will be retapped prior to reassembly. Also, in the preferred embodiment of the invention, the additional step of deburring an aperture adjacent a bottom surface thereof. Such bottom surface being disposed opposite such valve seat.

Further, according to the presently preferred embodiment of the invention, the valve restoration process will include the additional step of testing such valve after it has been reassembled but prior reassembly of such valve into such valve body. It is also preferred that the valve restoration process will include the additional step of testing such valve again after it has bee reassembled into such valve body but prior to reuse for its intended purposes. Furthermore, according to the most preferred practice of the process, such process will include the step of replacing a spring member when a new spring member before the reassembly of such valve.

The valve restoration process described above is particularly useful for pneumatic exhaust valves used in a railway brake application.

In most cases, the sequence of steps discussed above can be carried out in various orders without adverse effect on the function of the process.

While a number of presently preferred and alternative embodiments of the fluid pressure responsive valve restoration process have been described in considerable detail above, it should be understood by those persons who are skilled in the valve art that various modifications and adaptations of the present invention can be made without departing from the spirit and scope of the appended claims.

We claim:

1. A fluid pressure responsive valve restoration process for a valve removed from a valve body which will enable such valve to be reused after reconditioning for its intended purposes within such valve body without loss of both efficiency and durability during service, said valve restoration process comprising the steps of:
   (a) disassembling said valve into its component parts;
   (b) applying a preselected cleaning solution to a choke portion of said valve;
   (c) cleaning said choke portion of said valve with a brush having a predetermined stiffness to remove extraneous foreign material therefrom;
   (d) applying said preselected cleaning solution to a spring retainer portion of said valve;
   (e) cleaning said spring retainer portion of said valve with said brush having said predetermined stiffness to remove extraneous foreign material therefrom;
   (f) applying said preselected cleaning solution to a body portion of said valve;
   (g) cleaning said body portion of said valve with said brush predetermined stiffness to remove extraneous foreign material therefrom;
   (h) cleaning a valve seat disposed in said body portion of said valve to remove extraneous foreign material therefrom;
   (i) applying said preselected cleaning solution to a valve stem portion of said valve;
   (j) cleaning said valve stem portion of said valve with said brush having said predetermined stiffness to remove extraneous foreign material therefrom;
   (k) removing said preselected cleaning solution applied to each of said choke portion of said valve, said spring retainer portion of said valve, said body portion of said valve and said valve stem portion of said valve respectively applied in steps (b), (d), (f) and (i);
   (l) relapping with a lapping compound said valve stem portion cleaned in step (j) to said valve seat cleaned in step (h) to ensure a good sealing surface;
   (m) removing said lapping compound used in step (l) from each of said valve stem and said valve seat; and
   (n) reassembling said valve.

2. A fluid pressure responsive valve restoration process, according to claim 1, wherein said preselected cleaning solution in mineral spirits.

3. A fluid pressure responsive valve restoration process, according to claim wherein said brush having said predetermined stiffness is a wire brush.

4. A fluid pressure responsive valve restoration process, according to claim 1, wherein said removing of said preselected cleaning solution in step (k) includes the step of drying said each of said choke portion of said valve, said spring retainer portion of said valve, said body portion of said valve and said valve stem portion of said valve.

5. A fluid pressure responsive valve restoration process, according to claim wherein said valve restoration process includes the additional step of retapping a threaded portion of at least one of said body portion of said valve and said choke portion of said valve.

6. A fluid pressure responsive valve restoration process, according to claim 1, wherein said valve restoration process includes the additional steps of deburring an aperture adjacent a bottom surface thereof, said bottom surface being disposed opposite said valve seat.

7. A fluid pressure responsive valve restoration process, according to claim 1, wherein said valve restoration process includes the additional step of testing said valve after said reassembly thereof and prior to reassembly into said valve body.

8. A fluid pressure responsive valve restoration process, according to claim 7, wherein said valve restoration process includes the additional step of testing said valve after it has been reassembled into said valve body.

9. A fluid pressure responsive valve restoration process, according to claim 1, wherein said fluid pressure responsive valve is a pneumatic valve.

10. A fluid pressure responsive valve restoration process, according to claim 9, wherein said pneumatic valve is an exhaust valve.

11. A fluid pressure responsive valve restoration process, according to claim 10, wherein said preselected cleaning solution is mineral spirits.

12. A fluid pressure responsive valve restoration process, according to claim wherein said brush having said predetermined stiffness is a wire brush.

13. A fluid pressure responsive valve restoration process, according to claim 12, wherein said removing of said preselected cleaning in step (k) includes the step of drying said each of said choke portion of said valve, said spring retainer portion of said valve, said body portion of said valve and said valve stem portion of said valve.

14. A fluid pressure responsive valve restoration process, according to claim 13, wherein said valve restoration process includes the additional step of retapping a threaded portion of at least one of said body portion of said valve and said choke portion of said valve.

15. A fluid pressure responsive valve restoration process, according to claim 14, wherein said valve restoration process includes the additional step of deburring an aperture adjacent a bottom surface thereof, said bottom surface being disposed opposite said valve seat.

16. A fluid pressure responsive valve restoration process, according to claim 15, wherein said valve restoration process includes the additional step of testing said valve after said reassembly thereof and prior to reassembly into said valve body.

17. A fluid pressure responsive valve restoration process, according to claim 16, wherein said valve restoration process includes the additional step of testing said valve after it has been reassembled into said valve body.

18. A fluid pressure responsive valve restoration process, according to claim 1, wherein step (n) includes the step of replacing a spring member disassembled in step (a) with a new spring member.

19. A fluid pressure responsive valve restoration process, according claim 1, wherein steps (b) through (j), may be carried out in different valve component restoration sequences.

* * * * *

UNITED STATES PATENT AND TRADEMARK OFFICE
CERTIFICATE OF CORRECTION

PATENT NO. : 5,129,145

DATED : July 14, 1992

INVENTOR(S) : Alvin J. Matthews et al.

It is certified that error appears in the above-identified patent and that said Letters Patent is hereby corrected as shown below:

Column 3, line 64, delete "bee" and insert --been--.

Column 4, line 65, after Claim, insert --1,--.

Column 5, line 7, after Claim, insert --1,--.

Column 6, line 2, after Claim, insert --11,--.

Signed and Sealed this

Fifth Day of October, 1993

Attest:

BRUCE LEHMAN

Attesting Officer

Commissioner of Patents and Trademarks